United States Patent [19]
Gieske

[11] Patent Number: 5,348,327
[45] Date of Patent: Sep. 20, 1994

[54] COLLAPSIBLE MANUALLY TOWED OR BICYCLE TRAILERED SAILBOARD DOLLY

[76] Inventor: Juergen W. Gieske, 6232 W. Lloyd, Wauwatosa, Wis. 53213

[21] Appl. No.: 23,119

[22] Filed: Feb. 26, 1993

[51] Int. Cl.⁵ .............................................. B60P 3/10
[52] U.S. Cl. ............................... 280/47.331; 280/204; 280/292; 114/344
[58] Field of Search ...................... 280/40, 652, 47.331, 280/204, 292, 47.17; 114/344

[56] References Cited

U.S. PATENT DOCUMENTS

| 4,538,829 | 9/1985 | Horowitz | 280/641 |
| 4,544,172 | 10/1985 | Poulouin | 280/47.331 |
| 4,602,802 | 7/1986 | Morgan | 280/47.13 B |
| 4,712,803 | 12/1987 | Garcia | 280/47.13 B |
| 4,733,905 | 3/1988 | Buickerwood et al. | 297/129 |
| 4,781,397 | 11/1988 | Burn | 280/47.331 X |
| 4,792,072 | 12/1988 | Gibson | 224/32 |
| 4,824,127 | 4/1989 | Stamm | 280/47.331 |
| 5,114,165 | 5/1992 | Vogel | 280/47.331 |
| 5,207,441 | 5/1993 | Granbery | 280/47.331 X |

FOREIGN PATENT DOCUMENTS

| 2517274 | 6/1983 | France | 280/204 |
| 8401459 | 12/1985 | Switzerland | 280/47.331 |

OTHER PUBLICATIONS

Wind Surfing Magazine May, 1991 vol. 10, Issue 3, p. 112 advertisement for Vogel Enterprises', Vogel Llama device.

Primary Examiner—Margaret A. Focarino
Assistant Examiner—Carla Mattix

[57] ABSTRACT

A collapsible surf or sailboard dolly having the option to be manually towed behind one walking or be trailered behind a bicycle using a new and improved universal hitch attached to a bicycle. The bicycle hitch mounts generally horizontally to the bicycles accessory holes and clamped around frames chainstay holes. The dolly has a rear main wheeled support assembly strapped to a board. The main support assembly has wheels which are removable (in seconds) without the use of any tools. The wheels are held to the assembly with a Velcro and strap wrapping arrangement which positively hold the wheels to the main support tube. The dolly has a separate arm structure which straps to the nose of the board and is held onto the board by the wedging effect of the strapping arrangement. The rear support assembly is held to the board with the same wedging effect. A tightened center coupling strap causes the front arm structure and rear main support strapping to wedge over the board. The dolly can be quickly attached to the bicycle hitch using a hitch pin inserted through a hole provided in the arm structure and a hitch eye bolt without any disassembly of the dollies manually towed structure. Therefore, the user can manually tow their board and associated gear easily to the water's edge or trailer it behind ones bicycle.

4 Claims, 8 Drawing Sheets

COLLAPSIBLE MANUALLY TOWED OR BICYCLE TRAILERED SAILBOARD DOLLY

BACKGROUND

1. Field of Invention

This present invention relates to wheeled transporters for sailboards and surfboards and more specifically to transporters which are collapsible and easily convertible from one manually towed by a person walking into one trailered behind a bicycle.

2. Description of Prior Art

The task of transporting bulky sailboards and surfboards and their related equipment to the waters edge has burdened sailboard and surfboard enthusiasts as long as the sports themselves have been enjoyed. Multiple trips carrying various sail and surf peripheries are often made from the car or home to the beach. Various means for transporting sailboards and surfboards by a person towing a wheeled device behind them or trailering such a device behind a bicycle over land, across beaches and to the water's edge in a single trip have been suggested.

One problem with the prior art is the necessity of a long one-piece mast (used in windsurfing to give vertical support to the sail) for use as a handle for manual towing and for use as a hitch arm for towing a board behind a bicycle. Reference Wind Surfing Magazine's May 1991 Volume 10, Issue 3, page 112 advertisement for Vogel Enterprises', Vogel Llama device. Todays common windsurfing equipment uses multi-piece masts most of which disassemble in tension as would happen while towing or trailering, hence making this art unusable for towing or trailering all boards because the mast will disassemble.

Storage of the board dolly itself in the trunks of cars or in homes when not in use is difficult with the prior art. Some prior art have wheel assemblies which are semi-permanent requiring hand tools to remove them. Tools are required to remove the wheels of present dollies, hence making stowage in homes, autos, and at the beach a burden. Also, the prior art, with fixed wheel assemblies in place, does not allow the user to place the board with the dolly attached onto a car roof rack without the use of hand tools to remove the wheels.

Heretofore, hitches for trailering devices behind bicycles have required arms from the towed device to reach the frame of the bicycle. This is displayed in the child carriages seen towed behind bicycles. These trailered devices require bends in the tow arm for ideal in-line towing. A need hence exists for an independently mounted bicycle hitch. Such a hitch will receive a variety of trailered devices, in addition to my board dolly, with no custom reach required of my devices' tow arm.

Some prior art for wheeled transporters require the user to lift the board or canoe and additional gear and balance them during setup and while in transit as in U.S. Pat. No. 4,824,127 to Stamm. Kickstands have been proposed but become ineffective due to penetration and, hence, tipping in sand and grass as used in U.S. Pat. No. 4,712,803 to Garcia.

Additionally, some dolly main wheel support assembly frames are very complex to manufacture and assemble and require a large amount of volume for storage when not in use as in U.S. Pat. No. 4,538,829 to Horowitz.

Some prior art attach the board and miscellaneous gear to a main wheeled support device. They, by design, strap around the center to rear of the board as in U.S. Pat. No. 4,602,802 to Morgan. When pulling on the front of the board the main support devices and some handle devices or straps tend to slip or work their way off due to the progressively decreasing girth of the board as measured from center to rear. All board girths decrease from the center forward and center rearward by design. Hence, the wheeled device or handle loosens and pulls off resulting in a dolly which cannot maneuver or articulate the board as the user pulls it after prolonged use.

U.S. Pat. Nos. 4,733,905 to Buickerood et al and 4,792,072 to Gibson show various types of dollies for carrying boards or other articles.

Although various prior patents and devices advertised in magazines perform the task of transporting boards they are large, heavy, expensive for consumers, cumbersome to maneuver and store, difficult to set-up, and complex and difficult to manufacture.

OBJECTS AND ADVANTAGES

Accordingly, several objects and advantages of my invention are as follows:

a. To provide a board dolly which incorporates the use of an independent single arm structure to tow and trailer the board dolly without need for one-piece masts;

b. To provide a board dolly with wheel assemblies which easily attach to and detach from the main board support using a Velcro fastening system, thus allowing the user compact storage and quick assembly and disassembly of the board dolly without the use of any tools;

c. To provide a collapsible board dolly which requires a minimum of volumetric space for storage in homes and autos when not in use;

d. To provide a board dolly with a strapping arrangement which absolutely attaches the board to the dolly eliminating the arm structure or main wheeled support from sliding or working their way off while in transit;

e. To provide a board dolly whose main support wheel assembly is of simple design and easy to assemble and will not necessitate the need for stands for positioning the main wheeled support while attaching the board and peripheral equipment;

f. To provide a board dolly which is of a durable and reliable construction and is lightweight, approximately 10 lbs., and compact when disassembled;

g. To provide a strapping arrangement to accommodate the user a means to attach all peripheral sailing and surfing gear and equipment to the board;

h. To provide a strong new and improved independent bicycle hitch assembly having minimal parts in its structure which easily and universally attaches to bicycles for use as the board dolly hitch and a general hitch;

i. To provide a new and improved board dolly which, without reassembly and modification to structure, will convert from a manually towed board dolly into one trailered behind a bicycle;

j. To provide a new and improved board dolly which, by design, is susceptible of a low cost of manufacture with regard to both materials and labor, and which accordingly is then susceptible of low prices of sale to the consuming public;

k. To provide a board dolly which provides in the apparatus and methods of the prior art some of the advantages thereof, while simultaneously overcoming some of the disadvantages associated with them.

SUMMARY OF THE INVENTION

In accordance with the above and other objects, my invention is a manually towable and bicycle trailerable board dolly which comprises a new and improved main wheeled support assembly, tee shaped arm structure, board strapping arrangement, and universal bicycle hitch. The main tube support is simply a horizontally orientated tube which supports an end of a sail or surfboard. The wheel assemblies quickly and easily attach to and detach from the main support tube without the use of tools. This is done by the use of wheel adapters whose inside diameter threads onto one end of the wheel axle and whose outside diameter closely fits into the inside diameter of the main support tube. The wheel adapters are held into the main support tube by a Velcro hold-in strapping arrangement making the wheels quickly removable yet are held tightly in place during transport. The board strapping arrangement using a multitude of nylon webbing and adjustable buckles firmly wedges the arm structure strapping to one end of the board and the main wheeled support assembly strapping to the other end of the board to eliminate them from working their way off during transport. The tee shaped arm structure when strapped to the board has a manual handle which allows the user to pick up the front of the board dolly to manually tow the dolly. The tee shaped arm structure also has a provision for a hitch pin to enable the user to easily convert the board dolly from a manually towed device into one which is trailered behind a bicycle. No structural configuration changes are required of the board dolly for this conversion, only the insertion of the hitch pin through a hole in the end of the tee shaped arm structure and a bicycle hitch eye bolt. The bicycle hitch bar universally attaches to a bicycle using the bicycles' two accessory mounting holes two clamps and four nuts and bolts to fasten the hitch to the bicycle. The bicycle hitch bar has a general U-shape and mounts relatively horizontally to the bicycle frame.

DESCRIPTION OF DRAWINGS

The above and other objects of this invention will be better understood when consideration is given to the following detailed description thereof. Such description makes reference to the accompanying detailed drawings wherein.

DESCRIPTIONS OF THE PREFERRED EMBODIMENTS

Figure 1:
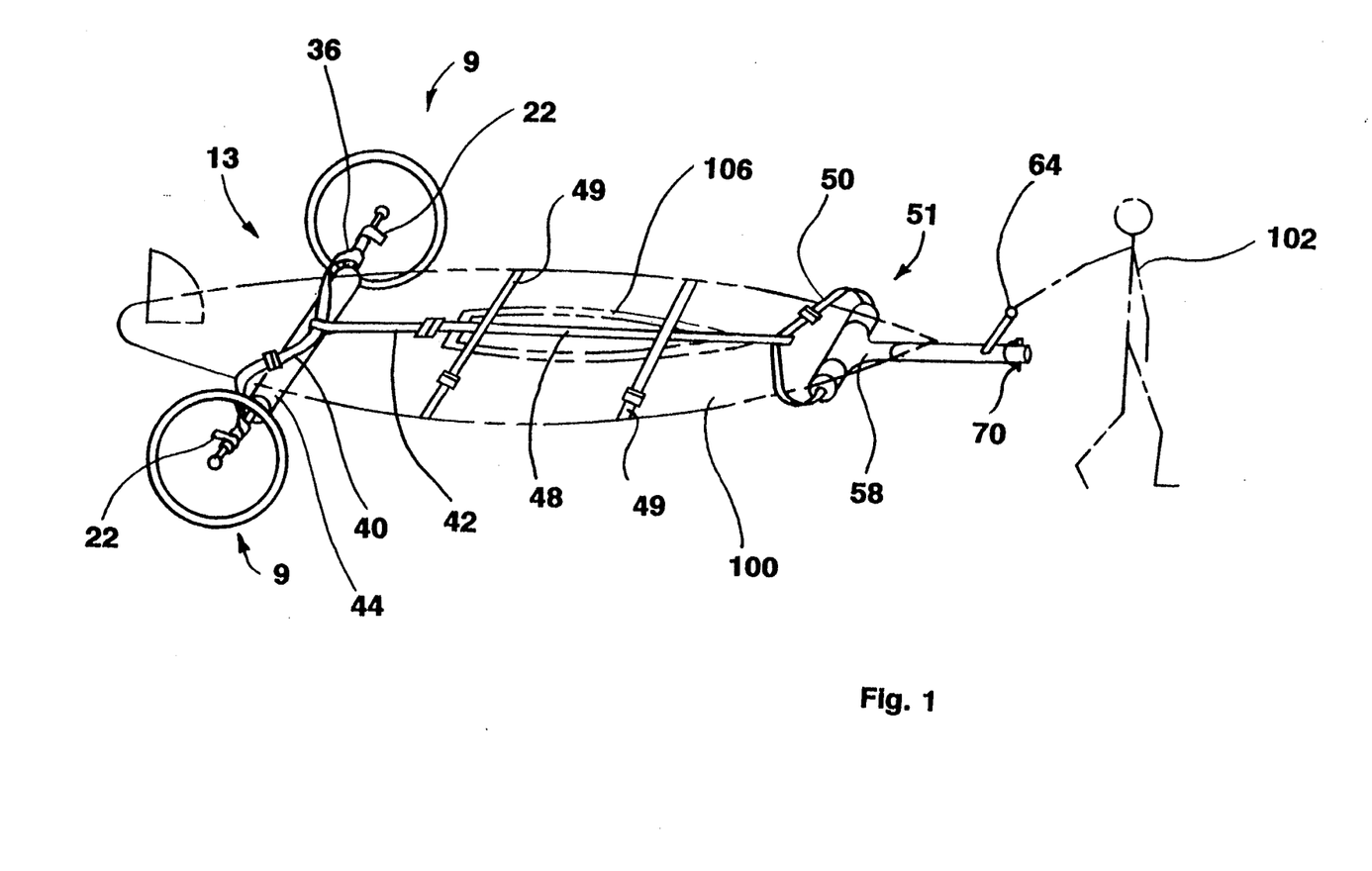
FIG. 1 is a perspective view of the collapsible board dolly in use during its manual towing option.
Figure 2:
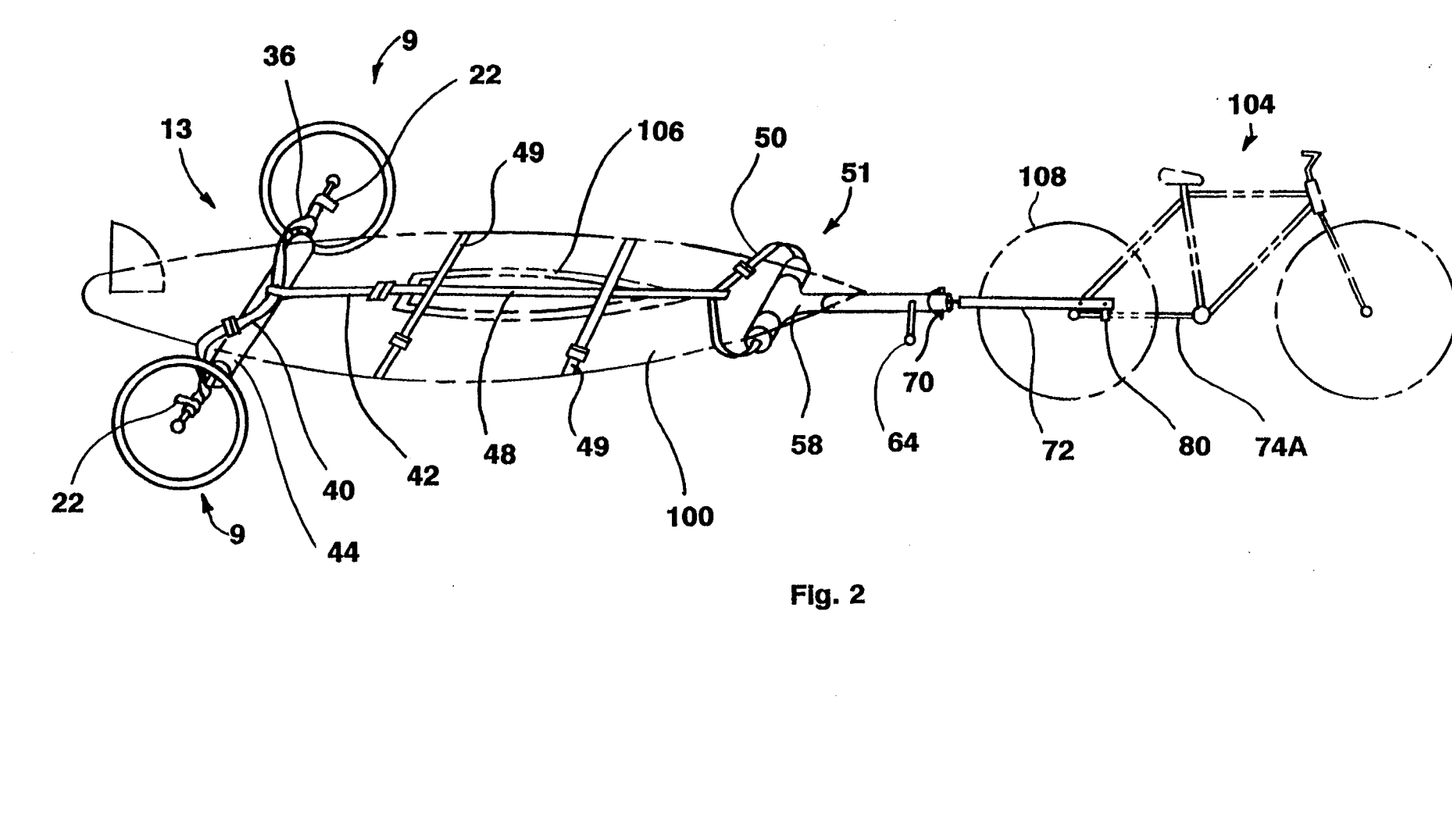
FIG. 2 is a perspective view of the collapsible board dolly in use during its bicycle trailering option.

Referring now to the particular drawings there is shown in FIG. 1 and FIG. 2 the assembled board dolly attached to a surfboard or sailboard (100) being manually towed by a person (102) or trailered behind a bicycle (104). The dolly is comprised of two identical wheel assemblies detailed in FIG. 3, the rear main support assembly shown in FIG. 4 and the arm structure assembly shown in FIG. 5.

Figure 3:
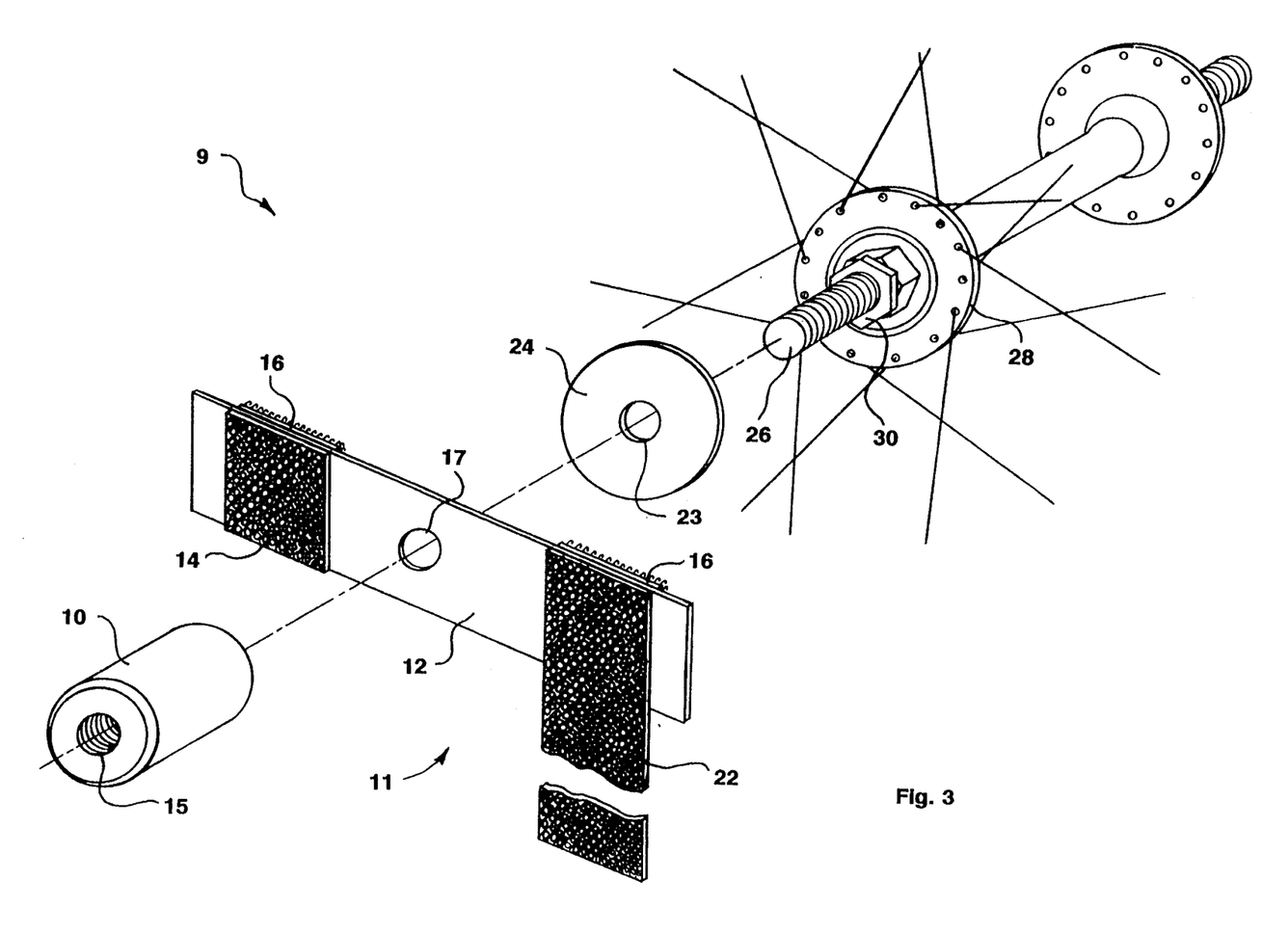
FIG. 3 is an exploded perspective view of the removable wheel assembly.

The independent ground engaging wheel assembly (9) shown in FIG. 3 is comprised of a lightweight wheel (28) represented by a wheel hub and a representative number of spokes, a washer (24), a wheel hold-in strap assembly (11), and a wheel adapter (10). The wheel has a rigid, threaded, preferably steel axle (26). Washer (24) has a center hole (23) diameter just large enough to slide over axle (26), is installed on axle (26) and rests against hub axle nut (30). The outside diameter of (24) is the same as the outside diameter of main support tube (34) in FIG. 4 and is provided to prevent the wheel adapter (10) from inserting too far into tube (34). The wheel hold in Velcro strap assembly (11) is comprised of a heavy duty flexible nylon webbing strap (12), one Velcro loop material square (14), a length of Velcro loop material (22), and two Velcro hook material squares (16). Webbing strap (12) is 1"×5" in size and has a hole (17) centered along both the 1" and 5" dimensions large enough to slide over axle (26). A square 1"×1" of Velcro loop material (14) is sewn on one side near one free end of webbing strap (12). On the opposite end of (12) as (14) and on the same side as (14) is sewn a 7.5" length of 1" wide Velcro loop material (22). This Velcro loop material (22) is sewn perpendicular to webbing strap (12). On the opposite side of webbing strap (12) as (14) and (22), on both ends of (12), is sewn two 1"×1" squares of Velcro hook material (16) in a mirror image orientation to (14) and (22). The Velcro strap assembly (11) is used to fasten and hold the wheel assemblies (9) to the main tube support (34). Wheel adapter (10) has an outside diameter such that it will have a close tolerance "push" fit into the standard inside diameter of 1" plastic PVC schedule 40 tube (34) of FIG. 4. The length of (10) is 1⅜" to ensure enough contact area to prevent a sloppy engagement. The wheel adapter (10) has a threaded inside diameter (15) with threads to match those of axle (26). After the washer (24) and the wheel hold-in Velcro strap assembly (11) are assembled, respectively, onto the axle (26) the threaded wheel adapter (10) is tightened onto the axle (26) with a thread locking substance such as Loctite holding (24) and (11) onto the wheel (28) to make the wheel assembly complete.

Figure 4:
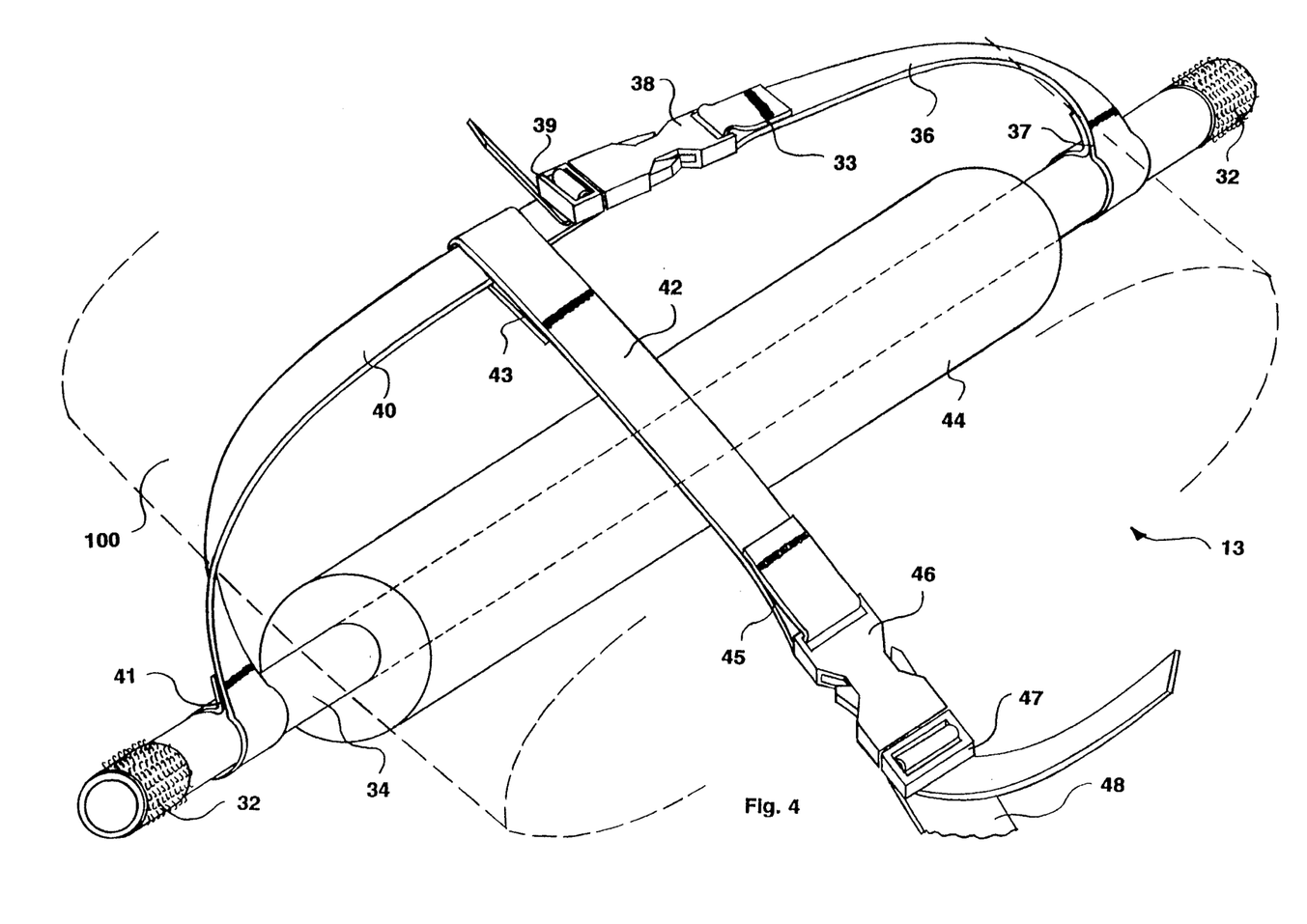
FIG. 4 is a perspective view of the main support assembly without the wheel assemblies, showing a dashed-line sail or surf board strapped to it.

FIG. 4 shows a perspective view of the main support assembly (13) used to support one end of a board. The assembly (13) has a horizontally orientated main support tube (34) which is 26" long and is made of PVC plastic pipe, although aluminum or other lightweight material may be used. A foam pad (44) is slid over the outside diameter of tube (34) and is 15" long. This pad is free to slide over tube (34), is centered over (34)'s length and is provided to protect the board as it is placed on tube (34). Strap (36) is made of a 12"×1" wide piece of heavy duty flexible nylon webbing and has a loop (37) sewn to itself on one end. This loop (37) is ⅞" larger in diameter than the outside diameter of tube (34) to allow it to be slid over (34). The other end of strap (36) is sewn in a loop to itself (33) through the receptacle half of an adjustable and separable buckle (38). The loop (37) of strap (36) is then slid over one end of tube (34). Adjustable heavy duty flexible nylon webbing strap (40) is 40"×1". Strap (40) has a loop (41) sewn to itself in one end. This loop (41) is ⅞" larger in diameter than the outside diameter of tube (34). The other end of strap (40) is reeved through a 1" diameter loop (43) in the rear half of a front-to-rear coupling strap (42) and through the adjustment half (39) of the adjustable and separable buckle. The loop (41) of strap (40) is then slid over tube (34) on the opposite end as loop (37). The rear half of the front-to-rear coupling strap (42) is made of heavy duty flexible nylon webbing and is 24"×1". The description of the front half of the front-to-rear coupling strap (48) will follow during the description of the arm structure of FIG. 5. Coupling strap (42) has the 1" diameter loop (43) sewn to itself on one end as mentioned above. The other end of strap (42) is sewn in a loop to itself (45) through the receptacle half of the adjustable and separable buckle (46). On both ends of tube (34) is 1" wide Velcro hook material (32) permanently fastened around the entire outside diameter of the tube (34). The Velcro hook material (32) is fastened to (34) by the use of a self adhesive backing which bonds to tube (34). This Velcro (32) keeps the straps (36) and (40) and pad (44) from sliding off the ends of (34). Velcro (32) primarily functions as the mating material for fastening and anchoring the Velcro wheel hold-in strap assembly (11) and, hence, the wheel assembly (28) firmly to the main support tube assembly (13).

Figure 5:
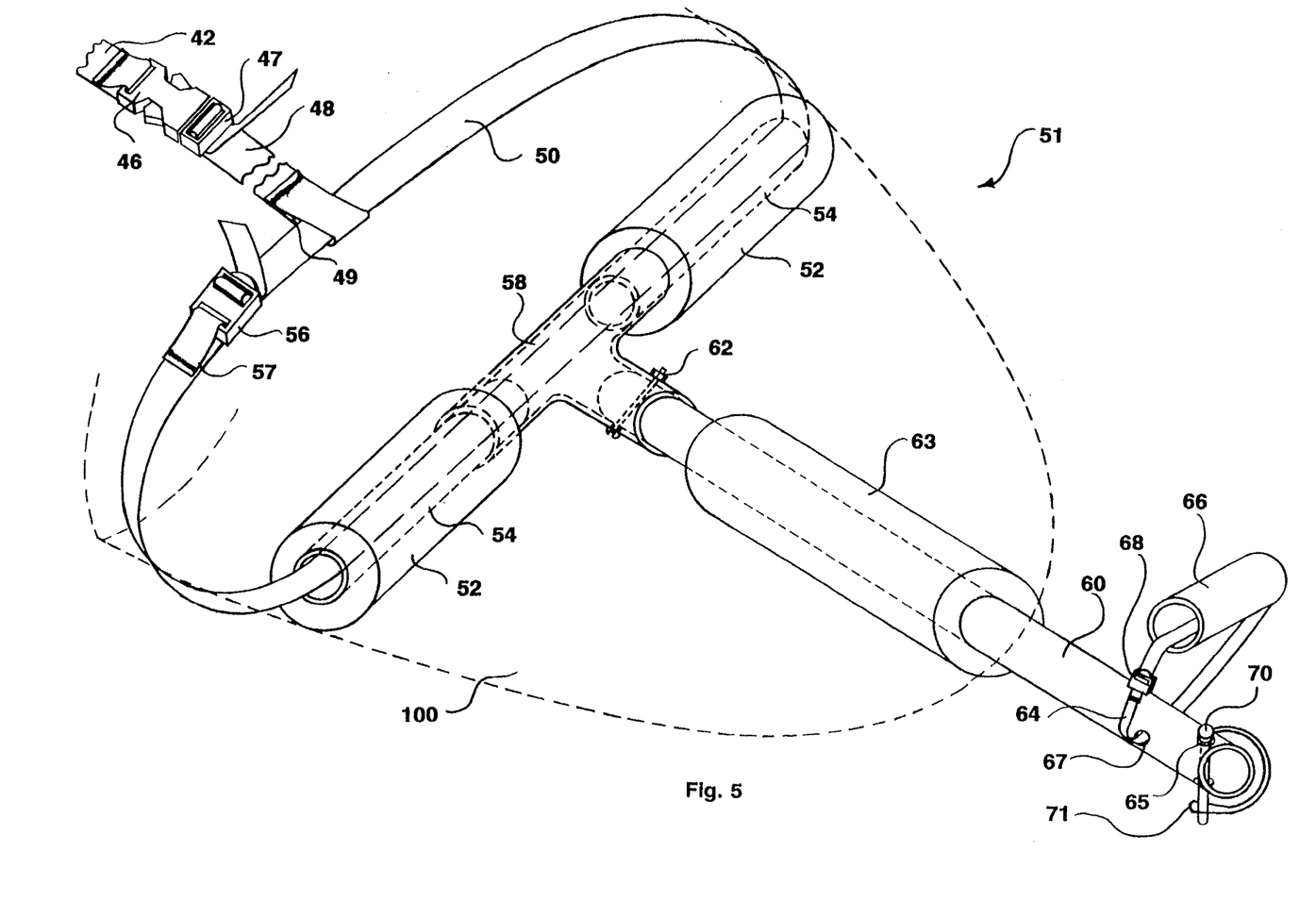
FIG. 5 is a perspective view of the arm structure with a dashed-line board strapped to it.

FIG. 5 shows a perspective view of the arm structure (51). The main support of the arm structure (51) come from tubes (54), tee (58) and tube (60). Tubes (54), (60), and tee (58) are made of plastic 1" schedule 40 PVC, but could be made of aluminum or other lightweight material. Tubes (54) are 6" long and are slid into and glued to the two horizontal openings in tee (58). Foam pads (52) are 5" long each and are slid over tubes (54) to protect the board during transport. Tube (60) is 20" long and is slid into and glued to the vertical opening in tee (58), perpendicular to tubes (54). Tube (60) is bolted (62) to tee (58) through a 3/16" diameter hole drilled horizontally through tee (58) and tube (60). Since the arm structure (51) is in constant tension during transit, a bolted (62) connection is required for safety to prevent (60) from coming out of (58). Front support strap (50), made of 1" wide heavy duty flexible nylon webbing, is 45" long. One end of strap (50) is sewn into a loop to itself (57) through the non-adjustable side of adjustable tabular buckle (56). The other end of strap (50) is lead through tubes (54) and tee (58), through a 1" diameter loop sewn to itself (49) in the front half of the front-to-rear coupling strap (48) and reeved through the adjustable side of adjustable buckle (56). Coupling strap (48), made of heavy duty flexible nylon webbing, is 1"×84" long. One end of (48) is sewn into the 1" diameter loop to itself (49) mentioned above. The other end of (48) is reeved through the adjustment half of the adjustable and separable buckle (47). Foam pad (63), which is 15" long, is slid over the outside diameter of tube (60). At the far end, opposite tee (58) on tube (60) is a 5/16" hole (65) approximately ⅜" from the end of tube (60) drilled vertically, or perpendicular to the plain of the arm structure tee (58), through (60) for a hitch pin (70). Hole (65) is located near the end of tube (60) to allow a maximum turning radius when trailering the board dolly. Hitch pin (70) is a quick connect and disconnect preferably steel pin with a spring retainer wire (71). Retainer (71) cannot be lost due to its permanent attachment to the head of pin (70). When retainer wire (71) is in the locked position around hitch pin (70)'s end, pin (70) cannot be lost or fall out during transit if installed through hole (65). Hitch Pin (70) is stored in hole (65) while manually towing the board dolly and hitch pin (70) is also used as the connecting pin between the arm structure (51) and the hitch eye bolt (82), in FIG. 6, when trailering the board dolly behind a bicycle. Two inches towards tee (58) from hole (65) is a ⅜" diameter hole (67) drilled horizontally, or in the plane of the arm structure tee (58), through tube (60). Hand-grip strap (64) is made of ½" wide flexible nylon webbing and is 14" long. One end of strap (64) is sewn in a loop to itself through the non-adjustable side of buckle (68). The other end of strap (64) is lead through a hole (67) in tube (60), through the hand-grip tube (66) made of 1" PVC schedule 40 tubing, and reeved through the adjustable side of buckle (68) for future adjustment of the length of the handle strap. Strap (50) is shown adjusted firmly around the nose of board (100). FIG. 1 and FIG. 2 also show peripheral gear hold down straps (49) holding down a windsurfing boom (106). The straps are made of 1"×60" nylon webbing and are buckled around the board.

Figure 6:
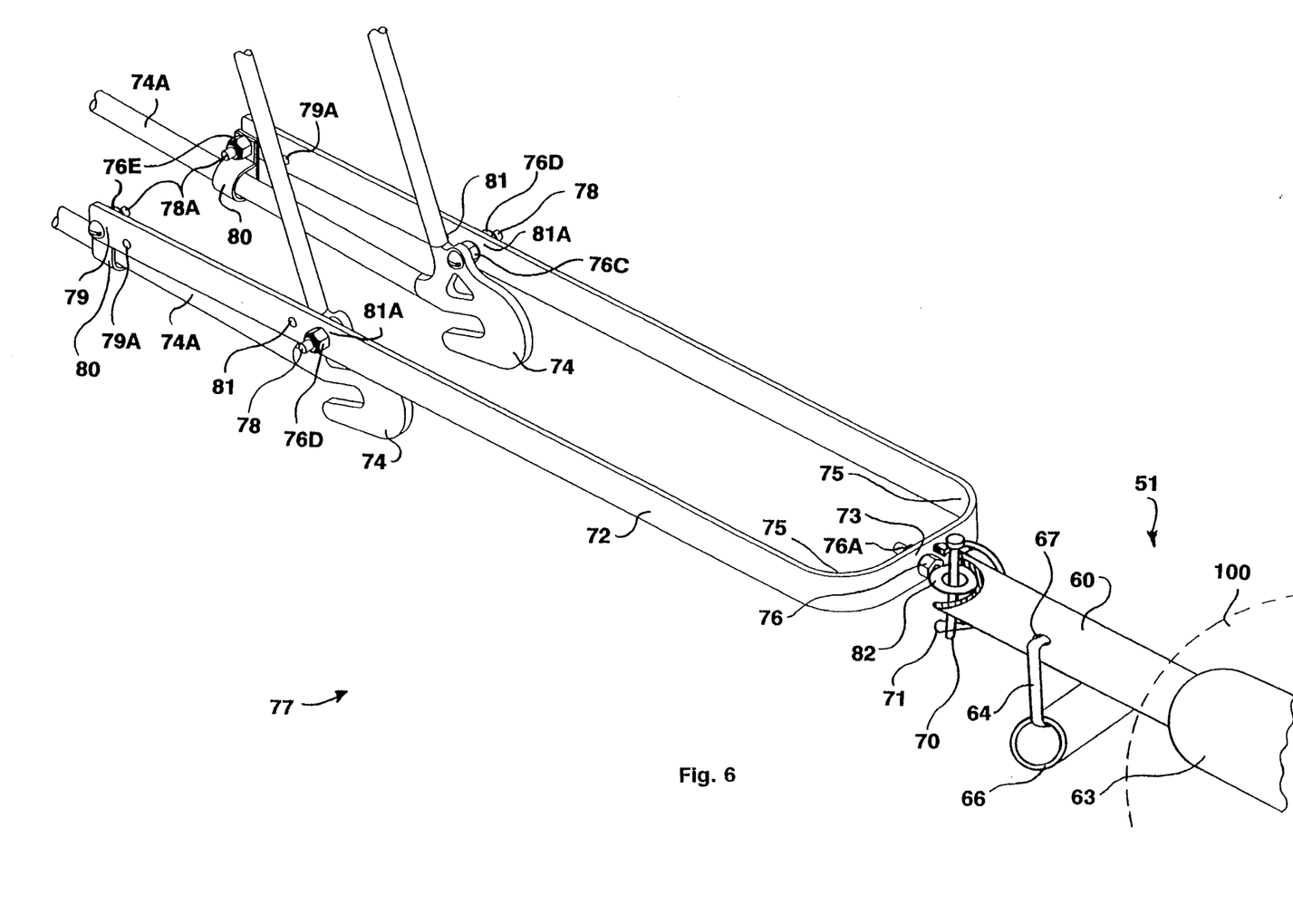
FIG. 6 is a perspective view of the bicycle hitch attached to the bicycle with the easily removable arm structure attached to the hitch.
Figure 6A:
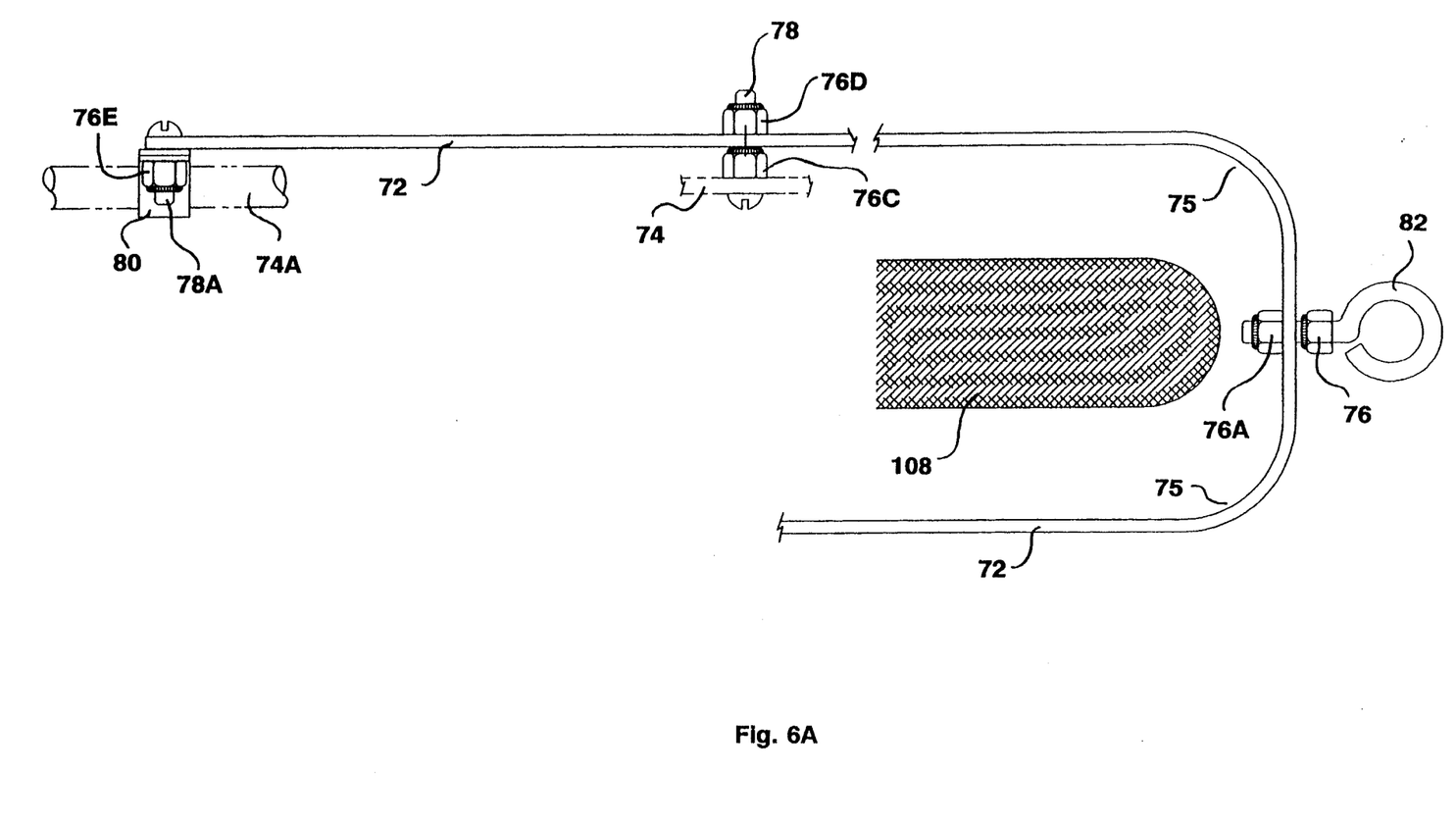
FIG. 6A shows a plan view of the bicycle hitch clamped to the bicycle frame chain stay tube and bolted to the bicycle frame accessory hole and shows the orientation of the bicycles rear wheel relative to the hitch bar and hitch eye bolt.

FIG. 6 shows a perspective view of a bicycle hitch (77) attached to a bicycle frame (74) and FIG. 6A shows the same hitch from a plan view with its clamped and bolted connections to the bike frame (74). Hitch Bar (72) is made of ⅛"×¾" flat stock steel. Other lightweight materials such as aluminum may also be used. Hitch bar (72) is bent into a U-shape with two radii (75) of ½". The hitch bar attaches to the bike frame (74) and (74A) using four points of attachment for rigid mounting preventing rotatable movement of the hitch bar during towing of the board dolly. A side of hitch bar (72) has two sets of two 3/16" diameter holes, (79), (79A), (81), and (81A) drilled ⅜" up from the bottom of (72). The first two holes (79) and (79A) are ¾" apart with hole (79) about ¼" from the end of (72). The second set of holes, the hitch accessory holes, (81) and (81A), in particular hole (81) is 5" from hole (79A). Holes (81) and (81A) are ¾" apart. Radius (75) is 13" from hole (81A) the other half of hitch bar (72) is a mirror image of the side just described and therefore it can be said to be manufactured the same way. A 5/16" hole (73) is drilled through hitch bar (72) for eye bolt (82) centered on the rear nonradiused section of the u-shaped hitch bar (72). This rear section is 4" long. Eye bolt (82) has a ½" diameter "eye" opening and is made of steel. A self locking "nyloc" nut (76) is first threaded onto eye bolt (82). The eye bolt is then inserted through hole (73) with the "eye" towards the outside of (72). Another "nyloc" locking nut (76A) is threaded onto eye bolt (82), but not fastened tightly so as to prevent rotation of eye bolt (82) in hole (73). Eye bolt (82) must rotate freely 360 degrees in hole (73) so no damage will occur to the bicycle frame (74), hitch bar (72), tube (60) or eye bolt (82) if the bicycle (74) is laid on its side or rotation of (82) is needed while trailering the board dolly with the bicycle. Although rotation is required of eye bolt (82) the gap left between self locking nut (76A) and hitch bar (72) is minimized yet still allow free rotation of (82). Eye bolt (82) is to be of length to allow only two to three threads to extend past nut (76A) so that no interference of eye bolt (82) exists with the bicycle tire (108).

The hitch bar (72) is attached to the bicycle frame (74) at two locations per side of hitch bar (72). Hitch bar (72) is in a generally horizontal orientation to the ground. A multitude of mounting holes are provided to accommodate varying bicycle frame geometries. The first location to attach the hitch bar (72) to frame (74) is at the rear accessary holes provided on bicycles as shown where screw (78) is located. Screw (78) size #8×1", is first pushed through the frame accessory hole, from the inside of frame (74) out, as shown in FIG. 6 and FIG. 6A. Screw (78) is not threaded into the frame holes since there are many sizes of threads provided in the accessory holes depending on the type and make of bicycle. Therefore, screw (78) passes through the bike frame accessory hole and is held in place by tightening the self locking "nyloc" nut (76C) to it. Hole (81A) (or hole (81)) of hitch bar (72) is passed over bolt (78) until it contacts nut (76C). Self locking "nyloc" nut (76D) is then threaded over bolt (78) to hold hitch bar (72) firmly in position on frame (74). Hole (81) or hole (81A) may be selected depending on how much clearance is desired between the bike tire (108) and eye bolt (82). Clamp (80) is made of heavy duty plastic or a plastic covered metal to protect the bicycles finish. Clamp (80) is sized such that its inside diameter is slightly larger than the outside diameter of the bike frame tube (74A) at hole (79) (or (79A)). Holes (79) or (79A) may be selected for fastening clamp (80) to depending on the location of various bicycle components in the area of holes (79) and (79A). Bolt (78A) is slid through hole (79) (or (79A)) and through the hole in clamp (80). Self locking "nyloc" nut (76E) is fastened onto bolt (78A). Since both sides of the hitch bar (72) fasten identically to the bicycle frame (74), repeat the above steps for both sides of (72). The bicycle hitch assembly (77) is now completely attached to the bicycle and ready for use.

Operation

Figure 3A:
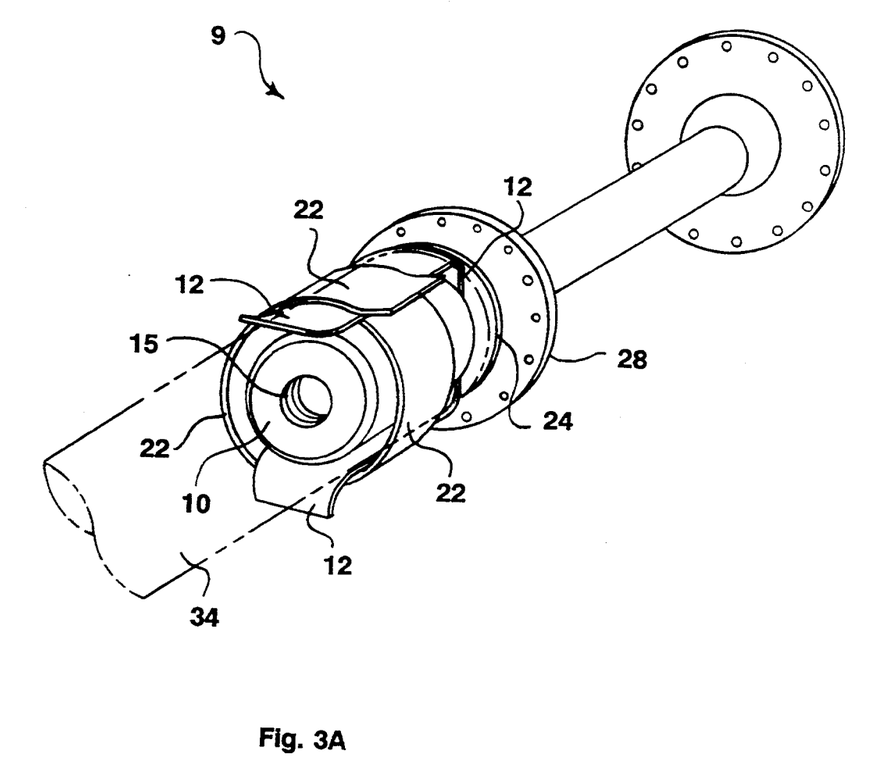
FIG. 3A is a perspective assembled view of the removable wheel assembly inserted into a dashed main tube support with a Velcro strap arrangement fastened around the main tube.

Now that the bicycle hitch bar (72) is assembled to the bicycle (74) as shown in FIG. 6 and FIG. 6A, one can attach the board (100) to the board dolly as shown in FIG. 1 and FIG. 2. FIG. 1 shows a person (102) manually towing the board dolly. First attach the wheel assemblies (9) of FIG. 3 to the main support assembly (13) of FIG. 4. FIG. 3A shows the wheel hold-in strapping arrangement fastened around the main tube support tube (34). Insert by easily sliding wheel adapter (10) into one end of support tube (34). Washer (24) provides a positive stop to prevent over insertion of wheel assembly (9). Attach, by pressing together, Velcro loop material square (14) and length (22) to the Velcro hook material (32) adhered to tube (34). Next, tightly wrap Velcro loop material strap (22) 360 degrees around main tube (34)'s Velcro hook material (32) and over both Velcro hook square's (16). The wheel assemblies attach to the main support assembly that easily. Wrapping Velcro material (22) around (32) and over both Velcro (16)'s and (14) causes a sandwich effect between the Velcro hook material (32) which is adhered permanently to support tube (34), Velcro loop square (14) which is sewn to nylon strap (12), and Velcro hook squares (16) also sewn to strap 12 directly on the opposite side of strap (12) as (14) and (22). The ends of strap (12) are now held firmly to tube (34). Since strap (12) is clamped between washer (24) and wheel adapter (10) the wheel cannot be removed from tube (34) without a force greater than those ever seen during normal or even adverse towing or trailering of the board dolly.

Next attach board (100) to rear support assembly (13) which we've just assembled. Place the rear ¼ of board (100) upside down over rear support assembly (13) as shown in FIG. 1 and FIG. 2. Center the board (100) over the main tube pad (44) between the wheels (28) and clip adjustable buckle halves (38) and (39) around board (100). Tighten strap (40) by pulling on the loose end through adjustable buckle half (39). Leave strap (42) laying on top of and towards the nose of board (100) as it will be used later. The rear of the board (100) is now assembled to the board dolly.

Attach the arm structure (51) to the front of the board as shown in FIG. 5. Strap (50), already reeved through buckle (56), forms a large loop. Slip that loop over the nose of the board with the arm structure (51) underneath the board. Be sure that the handle strap hole (67) is 2 to 8 inches beyond the tip of the board (100). This is to ensure that the handle (64) and hitch pin (70) can be accessed without the board interfering. Adjust and tighten the strap (50) through buckle (56) around the nose of the board. Leave strap (48) on top of and toward the rear of board (100) as it will be used later. The front of board (100) is now attached to the board dolly.

The final and one of the most important steps of assembly joins the rear support assembly (13) with arm structure (51) and creates a board dolly which is firmly attached to the board as shown in FIG. 1 and FIG. 2. Clip the buckle halves (46) and (47) together. Firmly tighten by pulling the front half of the front to rear coupling strap (48) through the adjustable buckle half (47). Since the rear half of front-to-rear coupling strap (42) is attached to rear support assemblies (13) strap (40) by loop (43) and the front half of the front-to-rear coupling strap (48) is attached to arm structures' (51) strap (50) by loop (49), tightening (48) and (42) together joins, or couples, the front handle tow arm and rear support assembly together over the board (100). A wind or surfboard's girth gets increasingly larger from the rear of the board to the center as well as from the nose of the board to the center. Therefore, when fixed length loops at the front and rear of a board, straps (36), (40) and (50) are pulled towards the larger girth section or center of the board, the loops (36, 40, 50) become wedged over the boards increasing center girth and are held in place by this wedging effect. The user (102) may now easily attach all peripheral equipment and gear (106) such as sail, mast, boom, etc. to the board dolly by strapping them over the top of the board (100) with hold-down straps (49) as shown in FIG. 1 and FIG. 2.

The board dolly is now completely attached to the board. The user (102) now has the option of either manually walking while towing the board behind them, FIG. 1, or attaching the board dolly to the bicycle hitch and towing it as shown in FIG. 2. To manually tow the board while walking, simply grab handle (64) with either hand and begin walking to the beach as shown in FIG. 1. To tow the board dolly behind a bicycle (104) remove hitch pin (70) from the arm structure (51) and slide the opening at the end of tube (60) over eye bolt (82) as shown in FIG. 6. Align hitch pin hole (65) in tube (60) with the ¾" "eye" hole in the eye bolt (82) and insert hitch pin (70) through hole (65) in tube (60) and the eye bolt (82). Return the spring wire retainer (71) to the secured position around pin (70). Be sure all strapping is tight and pedal away! The handle (64) does not have to be removed simply let it hang under the handle tow arm while towing the board dolly. And vice versa with the hitch pin, leave it in the secured position in hole (65) while manually towing the board dolly. Also, with only the removal of the wheel assemblies (9), the entire board (100) with the board dolly attached can be secured to the top of most all board car top carriers.

The board dolly is also completely collapsible. The reverse steps of the above assembly directions can be followed to obtain a very small package of components taking up very little volume.

Accordingly, it can be appreciated that the board dolly described in the invention can be quickly and easily converted from a device manually towed behind a walking person to one trailered behind a bicycle without major modification or re-assembly of the board dolly. Furthermore, this board dolly has additional advantages in that:

- it has wheel assemblies which attach to and detach from a main carrying support tube without the use of tools or hardware through use of a velcro and webbing sandwich-wrap arrangement (FIG. 3A) to ensure positive wheel attachment and easy wheel removal making a very compact design;
- it has a separate arm structure assembly which gives the user a single device to either tow the board dolly behind a walking person or trailer the board dolly behind a bicycle without the use of a mast;
- it provides the user a complete board dolly system which is lightweight and compact when un-assembled for storage and is quickly and easily re-assembled for use;
- it provides a universal bicycle hitch assembly which is strong, simple to install on a bicycle, and lightweight as shown in FIG. 6 and FIG. 6A;
- it provides a means for also transporting all peripheral gear and equipment to the beach along with the board;
- it provides a strapping arrangement to ensure that front handle assemblies and rear wheeled support assemblies remain wedged over the board and do not loosen and work their way off during transit;
- it assures a board dolly which is of durable and reliable construction which is of low cost to manufacture and therefore is susceptible to a low price of sale;
- it enables the wheeled transport of any size and shape board through the use of adjustable strapping;
- it ensures a corrosion resistance and lightweight design due to the use of PVC structural members and nylon webbing;
- it enables a user to attach their board to an auto roof rack and only have to remove the wheel assemblies leaving the rest of the dolly attached to the board due to the board dollies compact design.

Accordingly, it will be appreciated from the aforementioned description that the preferred embodiment does indeed accomplish the aforementioned objects.

While my above description contains many detailed specifications these should not limit the scope of the invention. Many other variations and alternative embodiments will be apparent to those skilled in the art. For example, a longer handle strap may be proposed to allow manual towing by pulling a longer strap from the shoulder; a variety of materials may be proposed in lieu of the PVC tubing for supports. Aluminum, and other alloy metals may be used. Accordingly, the scope of the invention should be determined not by the embodiments illustrated, but by the following claims and their legal equivalents.

I claim:

1. A collapsible manually towed and bicycle trailered sailboard dolly comprising:

a horizontally orientated main tube support structure adaptable to support an end of a sailboard;

a pair of independent ground engaging wheel assemblies comprising a means to attach and detach said wheel assemblies at the ends of said main tube support;

a means for strapping a board end to said main tube support wherein each end of a main tube strap has a loop which slides over said main tube support with one of said loops on either side of a board, the center of said main tube strap comprising an adjustable separable buckle connectable over said board;

a generally tee shaped rigid arm structure adaptable to support the opposite end of a board, said arm structure being used for both manually towing said board dolly and trailering said board dolly behind a bicycle;

a means for strapping the opposite board end to the top of said arm structure, wherein an arm structure strap passes through a top horizontal tube of said arm structure tee wrapping around the opposite board end, said arm structure strap having an adjustable buckle used to tighten said arm structure strap around the opposite board end with the bottom end of a vertical tube of said arm structure tee extending an adequate distance out past the opposite end of the board to allow for a means to manually tow said board dolly or trailer said board dolly behind a bicycle, said vertical tube of said arm structure tee having two holes, the first hole near the bottom end of said vertical tube is drilled through perpendicular to the plane of said arm structure tee, said first hole accepting a connection hitch pin for trailering said board dolly behind a bicycle, the second hole is approximately 1" up said vertical tube from said first hole and is drilled through in the plane of said arm structure tee, said second hole accepting a handle device for manually grasping said arm structure for manual towing of said board dolly;

a means for wedging said main tube strap and said arm structure strap over the respective ends of the board, wherein, a coupling strap with one end looped around said main tube strap and centered over the board and the other end of said coupling strap looped around said arm structure strap and centered over the board, said coupling strap having a separable and adjustable buckle approximately centered between said main tube support tube and said arm structure strap, said coupling strap is firmly tightened wedging said main tube strap and said arm structure strap onto the board, hence, firmly holding said main tube support and said arm structure to both ends of the board, transporting said board on said board dolly whereby said board on said board dolly can be transported;

a means for trailering said board dolly behind a bicycle, wherein, a u-shaped hitch bar is secured to a bicycle, the u-shaped hitch bar comprising a multitude of holes for adjustably mounting said hitch bar to many bicycle frame geometries, said hitch bar mounted in a generally horizontal orientation with the sides of said u-shape hitch bar extending on either side of the rear wheel of a bicycle, two of said holes in said hitch bar are arranged to accept bolting through frame accessory holes found in a bicycle frame, two of the frame accessory holes generally exist on a bicycle frame and are located above the rear axle of the bicycle and, hence, accommodate the bolting of two of said holes in said sides of said hitch bar, the two hitch accessory holes are located in said hitch bar such that the bottom or radius of said u-shaped hitch bar clears the rear of the bicycle tire, two additional holes for mounting said hitch bar to the bicycle frame are provided, one at each of the two ends of said u-shaped hitch bar to eliminate said hitch bar from rotatably moving about said hitch bar accessory holes when said board dolly is attached to said hitch bar, a clamping means wherein the clamps' inside diameter sized to fit over the bicycle chainstay tubes is secured over the chainstay tubes using a nut and bolt arrangement, said clamps grasp around the chainstay tubes and bolt to the hitch bar end holes firmly securing said hitch bar to the bicycle frame, an eye bolt is attached to said hitch bar through a hole located in the center of said radius of said u-shaped hitch bar, the eye bolt is bolted to said hitch bar, said eye bolt allows for a hitch pin to pass through the opening of said eye bolt, said eye bolt is allowed to rotate freely to prevent damage to said bicycle, arm structure, hitch bar, or board when the bicycle is in a non-perpendicular towing position relative to said board;

a means for connecting said hitch bar to said board dolly for trailering, wherein said eye bolt is inserted into said end of said vertical tube of said arm structure tee, said hitch pin is inserted into said first hole in said arm structure and through said eye bolt to join said eye bolt to said arm structure enabling said board dolly to be towed behind a bicycle, said hitch pin is stored in said first hole of said arm structure for both manually towing said board dolly and trailering said board dolly behind a bicycle, said hitch pin is held in place with a safety retainer clip.

2. The apparatus of claim 1 wherein said means of attaching to and detaching from said wheel assemblies is comprised of a Velcro and webbing strap arrangement which fastens said wheel assembly to said main tube support, the Velcro wheel hold-in strap arrangement is comprised of a webbing strap having a hole which slides over the wheel axle and a plurality of Velcro hook and loop materials sewn to said webbing strap, said Velcro wheel hold-in strap arrangement is held onto said wheel assembly axle by clamping between a wheel adapter and a washer, said washer slides over said wheel axle and rests against an axle nut, said washer having the same outside diameter as said main tube support, said wheel adapter has a threaded inside diameter with threads matching those of said wheel assemblies axle, said wheel adapters having an outside diameter as required for a close tolerance push fit into said main tube support, said wheel adapters having an adequate length inserted into said main tube support to maintain sufficient contact to prevent excessive movement between said wheel adapters and said main tube inside diameter surface, said Velcro wheel hold-in strap arrangements operate such that when said Velcro wheel hold-in straps are pressed to mating Velcro, which is permanently attached to said main tube support, two of said webbing straps per wheel assembly become sandwiched between the plurality of said Velcro hook and loop material sewn to said webbing straps and pressed over said webbing straps, hence, said wheel assemblies are fixed to said main support tube and ready for use.

3. The apparatus of claim 1 wherein said handle device comprises a handle strap passing through said second hole in said arm structure, said handle strap adjusts using a buckle, said handle strap is of adequate length to accommodate both towing of said board dolly by a users hand or off of a users shoulder.

4. The apparatus of claim 1 wherein adjustable straps are provided for holding miscellaneous peripheries to the board.

* * * * *